G. H. ULRICH.
CUTTER FOR SECOND GROWTH SAPLINGS AND THE LIKE.
APPLICATION FILED AUG. 6, 1917.
1,269,881. Patented June 18, 1918.
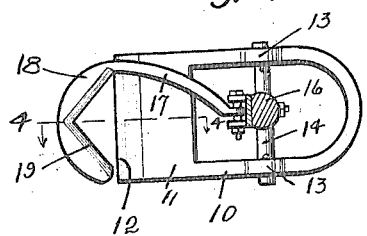
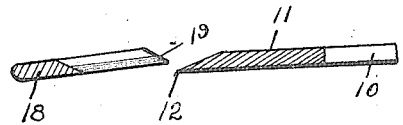
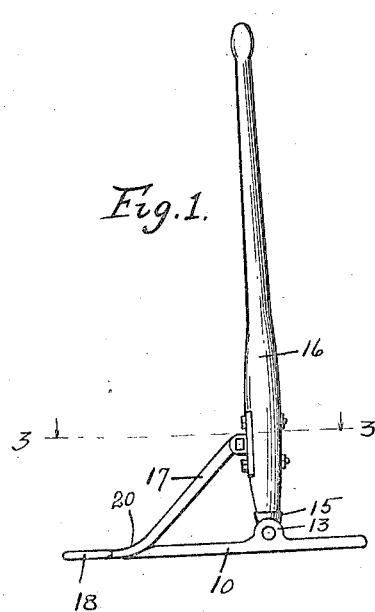
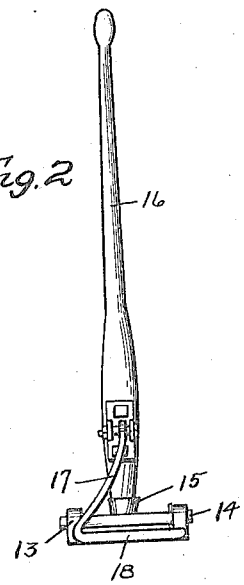
Witness
Will Freeman
Inventor
George H. Ulrich
BY Orwig & Bair ATTYS

UNITED STATES PATENT OFFICE.

GEORGE H. ULRICH, OF LADYSMITH, WISCONSIN.

CUTTER FOR SECOND-GROWTH SAPLINGS AND THE LIKE.

1,269,881.  Specification of Letters Patent.  Patented June 18, 1918.

Application filed August 6, 1917. Serial No. 184,698.

*To all whom it may concern:*

Be it known that I, GEORGE H. ULRICH, a citizen of the United States, and resident of Ladysmith, in the county of Rusk and State of Wisconsin, have invented a certain new and useful Cutter for Second-Growth Saplings and the like, of which the following is a specification.

The object of my invention is to provide a land clearing tool, of simple, durable and inexpensive construction, which may be used for cutting brush roots and the like in a convenient and facile manner.

A further object is to provide such a tool which can be used by the operator standing erect, which will cut close to the ground.

Still a further object is to provide such a tool, which is adapted for use in rocky soil.

With these and other objects in view my invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of my improved land clearing tool.

Fig. 2 shows a front elevation of the same.

Fig. 3 shows a horizontal, sectional view taken on the line 3—3 of Fig. 1, and

Fig. 4 shows a vertical, sectional view taken on the line 4—4 of Fig. 3.

In the accompanying drawings, I have used the reference numeral 10 to indicate generally the base of my improved land clearing tool, which base may be made in a variety of forms, but as shown, comprises a U-shaped frame, having at what may be called its forward end a forwardly extending flat blade 11, having at its forward edge a cutting edge 12.

The arms of the base frame 10 are provided with opposite, spaced bearings 13, in which is mounted a transverse rock shaft 14.

The rock shaft 14 is provided with a socket 15, illustrated in Figs. 1 and 2, to receive the lower end of a stout handle 16.

Pivotally mounted on the handle 16 near the lower end thereof, is a cutting tool supporting arm 17 which extends downwardly and forwardly from the handle 16, as illustrated, and is provided at its forward end with a cutting blade 18, having a sharp cutting edge 19 V-shaped in general outline adjacent to the handle 16.

It will be noted that the handle 16 is so mounted that it may be rocked forwardly and rearwardly, and so that part of the frame of the base 10 is rearwardly of the handle, while the cutting blade 11 is forwardly of the handle.

It should be noted that the cutting edge 12 of the blade 11 is beveled on its upper surface, as is the cutting edge 19.

In the practical use of my improved land clearing tool, the base 10 is placed on the ground with the cutting edge 12 adjacent to the brush or the like which it is desired to cut.

The foot of the operator may be placed on the rearwardly extending portion of the base of the frame 10, if desired.

At the beginning of the operation, the handle 16 is swung forwardly, and the handle is then drawn rearwardly for engaging the root or brush or the like in the V-shaped notch formed by the cutting edge 19, whereby the cutting edge 19 is drawn above and across the cutting edge 12 with a shearing movement.

It should be mentioned in this connection that the arm 17, at its lower end is curved, as illustrated at 20 in such a manner that the blade 18 rests in substantially horizontal position and travels in substantially horizontal position in the cutting operation.

The blade 18 is slightly inclined, as shown in Fig. 4.

The arm 17 is so arranged that it will slide on the blade 11, and at all times prevent any contact between the sharp edges 19 and 12.

It is well known that clearing brush and the like, and particularly in cutting sprouts from around stumps the work is severe. The work is ordinarily done with a heavy brush scythe or with an ax. With my device the same work can be done with a great deal less strain by utilizing the leverage of the handle and cutting the sprout or brush with a pair of blades or edges, one of which is given a relatively shearing movement with relation to the other.

Some changes may be made in the construction and arrangement of the various parts of my improved device, without departing from the essential features and purposes of my invention, and it is my intention to cover by this application any modified forms of structure or use of mechanical equivalents, which may be reasonably included within the scope of my claims.

The operator can stand erect while operating my improved land clearing tool and yet the tool will cut close to the ground and more rapidly than an ax. In stony ground this tool can be used and will not become dull nearly so quickly as an ax or other striking tool.

I claim as my invention:

1. A land clearing tool, comprising a base, a substantially horizontal cutting edge at the forward portion of said base, a handle pivotally mounted on said base adapted to be grasped by a person standing, a blade supporting arm pivoted to said handle, a blade on said arm adapted to slide in a substantially horizontal plane in different positions of the handle to coact with said first cutting edge.

2. In a device of the class described, a base having at its forward end a cutting edge, a handle pivotally mounted on said base between the ends thereof adapted to be grasped by a person standing, an arm pivoted to said handle near the lower end thereof, extending downwardly and laterally, from the handle, a laterally extending, substantially, horizontal blade on the lower end of said arm, having a cutting edge adapted to coact with said first edge and a member extending rearwardly from said base to be engaged by the foot of the operator to prevent the tool from sliding.

3. In a device of the class described, a base having at its forward end, a substantially horizontal cutting edge, a handle pivotally mounted on said base between the ends thereof adapted to be grasped by a person standing, an arm pivoted to said handle near the lower end thereof, extending downwardly and laterally, from the handle, and a laterally extending, substantially horizontal blade on the lower end of said arm, having a cutting edge substantially V-shaped in outline adapted to coact with said first cutting edge.

Des Moines, Iowa, July 5, 1917.

GEORGE H. ULRICH.

Copies of this patent may be obtained for five cents each, by addressing the "Commissioner of Patents, Washington, D. C."